US012758983B2

(12) United States Patent
Long et al.

(10) Patent No.: US 12,758,983 B2
(45) Date of Patent: Oct. 13, 2026

(54) ELECTROSTATIC CHARGING DEVICE AND ASSEMBLY METHOD THEREOF

(71) Applicant: AirQuality Technology (Shanghai) Co., Ltd., Shanghai (CN)

(72) Inventors: Shidan Long, Shanghai (CN); Shanqing Meng, Shanghai (CN); Lisun Wang, Shanghai (CN); Kui Cai, Shanghai (CN)

( * ) Notice: Subject to any disclaimer, the term of this patent is extended or adjusted under 35 U.S.C. 154(b) by 0 days.

(21) Appl. No.: 19/013,443

(22) Filed: Jan. 8, 2025

(65) Prior Publication Data

US 2025/0375773 A1 Dec. 11, 2025

Related U.S. Application Data

(63) Continuation of application No. PCT/CN2024/132597, filed on Nov. 18, 2024.

(30) Foreign Application Priority Data

Jun. 7, 2024 (CN) ......................... 202410739840.3

(51) Int. Cl.
*B03C 3/38* (2006.01)
*B03C 3/41* (2006.01)
*B03C 3/86* (2006.01)

(52) U.S. Cl.
CPC .................. *B03C 3/38* (2013.01); *B03C 3/41* (2013.01); *B03C 3/86* (2013.01)

(58) Field of Classification Search
None
See application file for complete search history.

(56) References Cited

U.S. PATENT DOCUMENTS

| | | | | |
|---|---|---|---|---|
| 12,603,481 | B2 * | 4/2026 | Gajendra | H01T 23/00 |
| 2017/0341087 | A1 * | 11/2017 | Yuge | A47L 9/1683 |
| 2018/0169666 | A1 * | 6/2018 | Loreth | F24F 8/10 |
| 2020/0188830 | A1 | 6/2020 | Shin | |
| 2023/0046930 | A1 * | 2/2023 | Hasegawa | B03C 3/41 |

(Continued)

FOREIGN PATENT DOCUMENTS

| | | | | | |
|---|---|---|---|---|---|
| CN | 101566759 | A | * 10/2009 | | B82Y 20/00 |
| CN | 102151609 | A | 8/2011 | | |

(Continued)

OTHER PUBLICATIONS

Translation of CN 216080173 from ESPACENET (Year: 2021).*

*Primary Examiner* — Brit E. Anbacht

(57) ABSTRACT

An electrostatic charging device and an assembly method thereof, the electrostatic charging device includes a frame body, at least one first accommodating groove arranged inside the frame body, an electrode body arranged inside the at least one first accommodating groove and arranged along a length direction of the at least one first accommodating groove, and a plurality of electrode heads penetrating through a wall of the at least one first accommodating groove and connected with the electrode body; the plurality of electrode heads are arranged along the electrode body at intervals, such that a discharging area covers a whole of an interior of the frame body; the electrode body and a connector configured to connect the plurality of electrode heads and the electrode body are both sealed in the at least one first accommodating groove.

13 Claims, 10 Drawing Sheets

(56) References Cited

U.S. PATENT DOCUMENTS

| | | | | |
|---|---|---|---|---|
| 2024/0085039 | A1* | 3/2024 | Kang | F24F 8/30 |
| 2024/0139758 | A1* | 5/2024 | Kang | B03C 3/68 |

FOREIGN PATENT DOCUMENTS

| | | | | | |
|---|---|---|---|---|---|
| CN | 206716209 | U | | 12/2017 | |
| CN | 207170006 | U | | 4/2018 | |
| CN | 111686937 | A | | 9/2020 | |
| CN | 212431187 | U | | 1/2021 | |
| CN | 214487365 | U | | 10/2021 | |
| CN | 113731633 | A | * | 12/2021 | B03C 3/017 |
| CN | 216080173 | U | | 3/2022 | |
| CN | 217190198 | U | | 8/2022 | |
| CN | 115581791 | A | | 1/2023 | |
| CN | 118499896 | A | | 8/2024 | |
| JP | 2002260821 | A | | 9/2002 | |
| JP | 2007222717 | A | | 9/2007 | |
| JP | 2014087732 | A | | 5/2014 | |
| KR | 200393391 | Y1 | * | 8/2005 | A61L 9/205 |
| KR | 20100093810 | A | | 8/2010 | |
| KR | 20240035316 | A | * | 3/2024 | F24F 8/192 |
| KR | 102938374 | B1 | * | 3/2026 | B03C 3/66 |
| WO | WO-2023090595 | A1 | * | 5/2023 | B03C 3/68 |
| WO | WO-2024085145 | A1 | * | 4/2024 | B03C 3/41 |

* cited by examiner

ELECTROSTATIC CHARGING DEVICE AND ASSEMBLY METHOD THEREOF

CROSS-REFERENCE TO RELATED APPLICATIONS

The present application claims priority to Chinese Patent Application No. 2024107398403, filed on Jun. 7, 2024, the entire disclosure of which is incorporated herein by reference.

TECHNICAL FIELD

The present disclosure relates to the technical field of air purification, and in particular to an electrostatic charging device and an assembly method thereof.

BACKGROUND

At present, the air purification technology is mainly divided into the media filtration technology and the electrostatic purification technology.

The media filtration technology is mature and has a relatively stable operation. However, it has high wind resistance and fan energy consumption. The media filtration device is also easy to breed bacteria and viruses, and cannot be sterilized and disinfected, thereby resulting in odor. It needs to frequently replace parts, resulting in a large number of consumables, high operation and maintenance costs, thus it is not energy-efficient and environmentally friendly.

The electrostatic purification device can remove particles, be sterilized and disinfected. It has a low wind resistance and can be washed repeatedly. However, it has a low purification efficiency, a relatively high power. It is also easy to strike arc, and has a high ozone content, thus has a poor safety and short service life. It also has a large weight, high maintenance costs, thus it is not energy-efficient and environmentally friendly. It can not be widely applied in the field of mild pollution air purification, and can only be applied in a few scenarios.

The micro-electrostatic technology is compatible with the advantages of media filtration technology and electrostatic purification technology, taking into account efficient purification and dust removal, sterilization, and has ultra-low power, low resistance, high humidity resistance, high safety. The micro-electrostatic purification device can be repeatedly cleaned, does not need consumables, and has a service life of up to 10 years.

At present, the discharging needle of the electrostatic charging device in the market is set up windward, and is perpendicular to the micro-electrostatic filter body. Such a structure can not fully and effectively utilize the size in the thickness direction of the purification equipment, and it occupies more space in the thickness direction. When it is installed and used with air conditioning equipment, it is often unable to adapt since the space in the thickness direction is limited. Alternatively, in order to make concessions, the dust collecting device in the second section is thinned to sacrifice the purification capacity of the dust collecting device. At the same time, the ionized structure is complicated and the overall production cost is higher. In addition, the tip of the discharging needle has a sharp angle, so it is necessary to be careful to avoid collision during production, installation, transportation, and maintenance.

Based on the above, the existing technologies need to be further improved.

SUMMARY OF THE DISCLOSURE

The disclosure aims to overcome the above technical deficiencies, provide an electrostatic charging device and an assembly method thereof to solve the technical problem in the prior arts that the electrostatic charging device occupies too much installation space.

In order to achieve the above technical purposes, the disclosure provides the following technical solutions.

In the first aspect, the disclosure provides an electrostatic charging device, including: a frame body, at least one first accommodating groove arranged inside the frame body, an electrode body arranged inside the at least one first accommodating groove and arranged along a length direction of the at least one first accommodating groove, and a plurality of electrode heads penetrating through a wall of the at least one first accommodating groove and connected with the electrode body; wherein the plurality of electrode heads are arranged along the electrode body at intervals, such that a discharging area covers a whole of an interior of the frame body; the electrode body and a connector configured to connect the plurality of electrode heads and the electrode body are sealed in the at least one first accommodating groove.

Further, a plurality of first accommodating grooves are arranged at intervals, and a plurality of electrode bodies located in the plurality of first accommodating grooves are sequentially connected in an end-to-end manner.

Further, an angle between an arrangement direction of each electrode head and a plane in which the frame body is located is greater than or equal to 0 degrees and less than or equal to 60 degrees, and both sides of each first accommodating groove are connected with the electrode heads; and a distance between two adjacent electrode heads on a same side of a same first accommodating groove is equal to a distance between two adjacent first accommodating grooves.

Further, the angle between the arrangement direction of each electrode head and the plane in which the frame body is located is 0 degrees.

Further, the electrode heads located on two sides of the same first accommodating groove are arranged in parallel to form a plurality of electrode head pairs, and the electrode head pairs located in different first accommodating grooves are in a staggered arrangement or in a matrix arrangement.

Further, the electrode heads located on two sides of the same first accommodating groove are in a staggered arrangement.

Further, the electrode body is connected with a high voltage power supply, the high voltage power supply is a built-in high voltage power supply or an external high voltage power supply.

Further, a plurality of second accommodating grooves configured to hold the plurality of electrode heads are fixedly arranged on an outer side of the wall of the at least one first accommodating groove, and the plurality of second accommodating grooves one-to-one correspond to the plurality of electrode heads.

Further, the at least one first accommodating groove is detachably connected with the interior of the frame body, and each end of the at least one first accommodating groove is provided with a notch matching the frame body, and when the at least one first accommodating groove is deposited inside the frame body, the at least one first accommodating groove does not protrude from an outer surface of the frame body.

Further, each electrode head is a carbon fiber brush, fascicular wire or a metal tip.

Further, the frame body has a first frame and a second frame, and the first frame and the second frame are complementary structures that can be spliced.

Further, the frame body is provided with a discharging conductor, and the discharging conductor is provided with a plurality of discharging conductive holes matching the plurality of electrode heads.

In the second aspect, the disclosure provides an assembly method for assembling the electrostatic charging device, when the plurality of first accommodating grooves are separately connected to the frame body, the assembly method comprises the following steps:

Step S11. arranging the plurality of first accommodating grooves at intervals;

Step S12, putting the plurality of electrode bodies into the plurality of first accommodating grooves, and sequentially connecting the electrode bodies in different first accommodating grooves in an end-to-end manner to form an S-bend shape;

Step S13, sequentially passing the plurality of electrode heads through the wall of each first holding groove to connect with the plurality of electrode bodies;

Step S14. filling a sealant into the plurality of first accommodating grooves;

Step S15. after the sealant is solidified, installing the frame body to a periphery of the plurality of first accommodating grooves;

when the plurality of first accommodating grooves are integrated with the frame body, the assembly method comprises the following steps:

Step S21, putting the plurality of electrode bodies into the plurality of first accommodating grooves;

Step S22, sequentially passing the plurality of electrode heads through the wall of each first holding groove to connect with the plurality of electrode bodies;

Step S23. filling the sealant into the plurality of first accommodating grooves, and waiting for a period of time until the sealant has solidified.

Further, when the plurality of first accommodating grooves are separately connected to the frame body, the assembly method comprises the following steps:

step S16, installing the discharging conductor on the frame body, wherein the discharging conductive holes on the discharging conductor correspond to positions of the plurality of electrode heads.

Beneficial Effects:

1. A new electrostatic discharging mode is adopted, the electrode heads are evenly arranged, such that the electrostatic charging device can be more fully discharged, and has no charging dead zone, has a better particle charging uniformity and a better charging effect.
2. Since the first accommodating grooves accommodating the electrode bodies are set inside the frame body, the angle between an arrangement direction of each electrode head and a plane in which the frame body is located ranges between 0 degrees to 60 degrees, such that the thickness of the electrostatic charging device is reduced, and the ion concentration released per unit volume is larger, thereby saving the installation space of the electrostatic charging device and providing a wider application range, especially the purification scene where the installation size is very limited in the width direction.
3. The angle between an arrangement direction of each electrode head and a plane in which the frame body is located ranges between 0 degrees to 60 degrees, the electrode heads are not set windward. In the production, transportation, installation and maintenance, it is not easy to touch or bump the tip of electrode heads. When the flexible electrode head such as carbon fiber brush is used, it is more humanized.

DETAILED DESCRIPTION

In order to enable the persons skilled in the technical field to better understand the application solutions, the technical solutions in the application embodiment will be clearly and completely described below in combination with the attached drawings in the application. Obviously, the described embodiments are only a part of the application embodiments, but not all of the embodiments. Based on the embodiments in this application, all other embodiments obtained by a person of ordinary skill in the field without creative labor shall fall within the scope of protection in this application.

Figure 1:
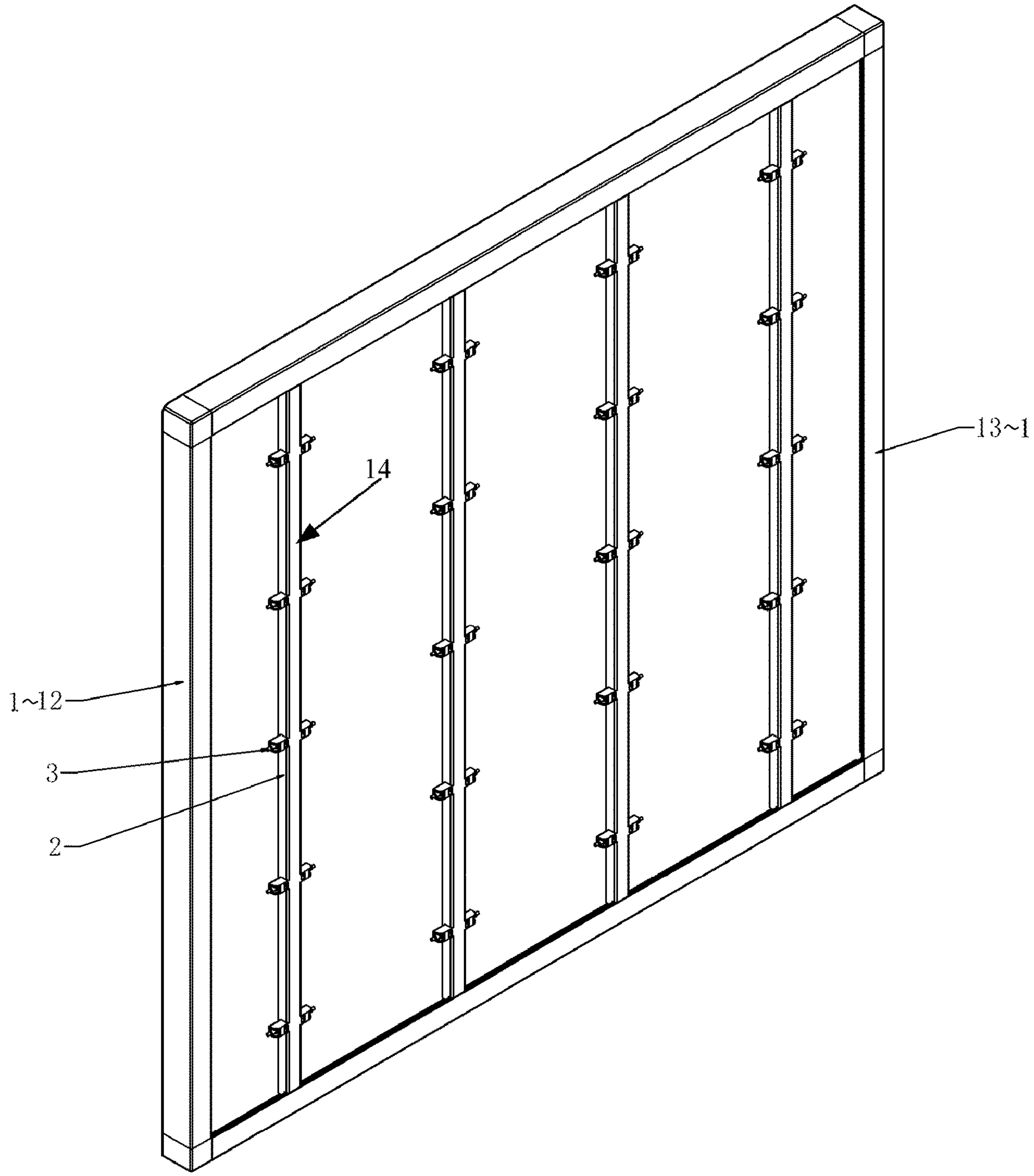
FIG. 1 is a schematic diagram of an electrostatic charging device according to an embodiment of the present disclosure.
Figure 2:
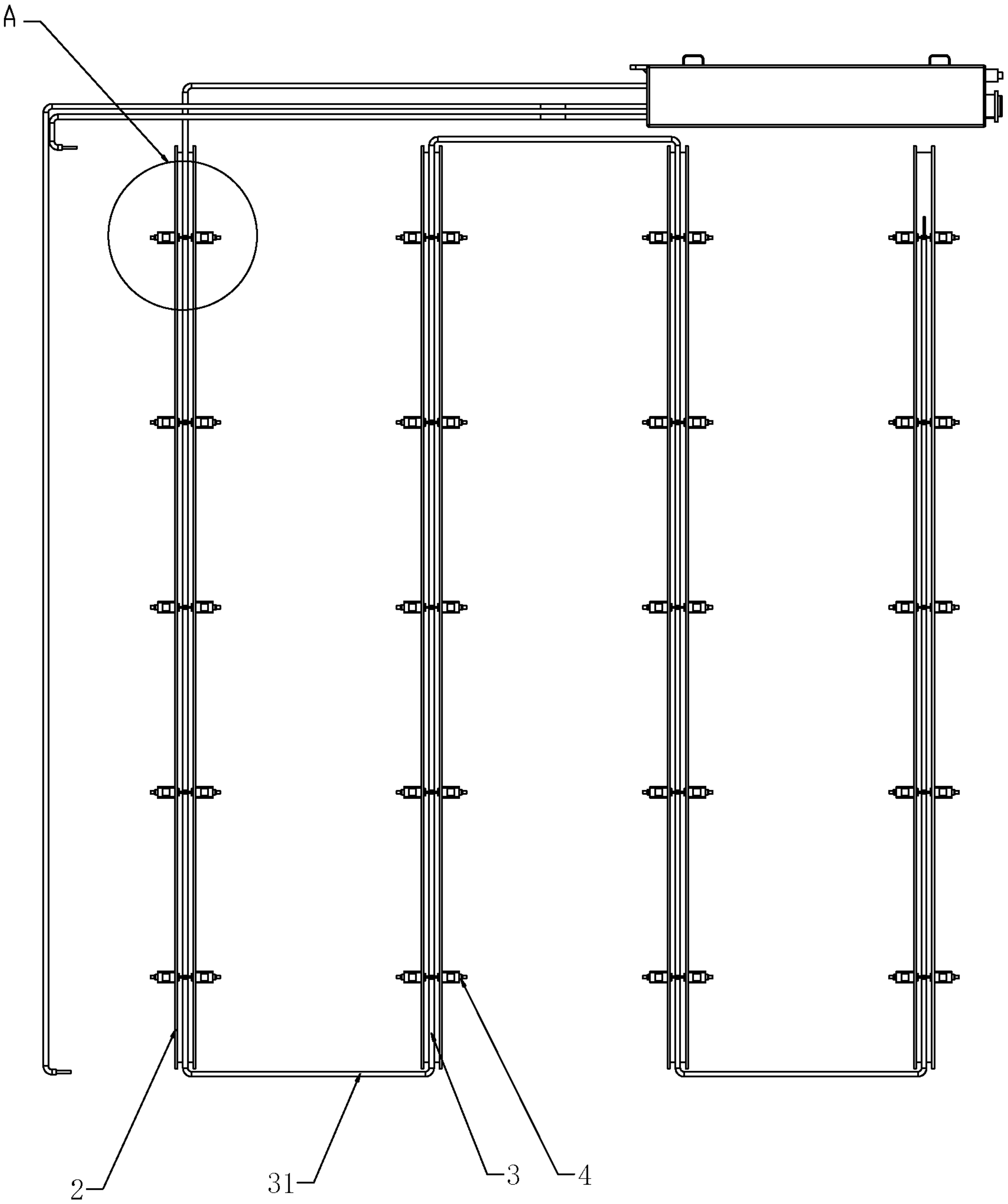
FIG. 2 is another schematic diagram of the electrostatic charging device according to an embodiment of the disclosure (the frame body is not shown)
Figure 3:
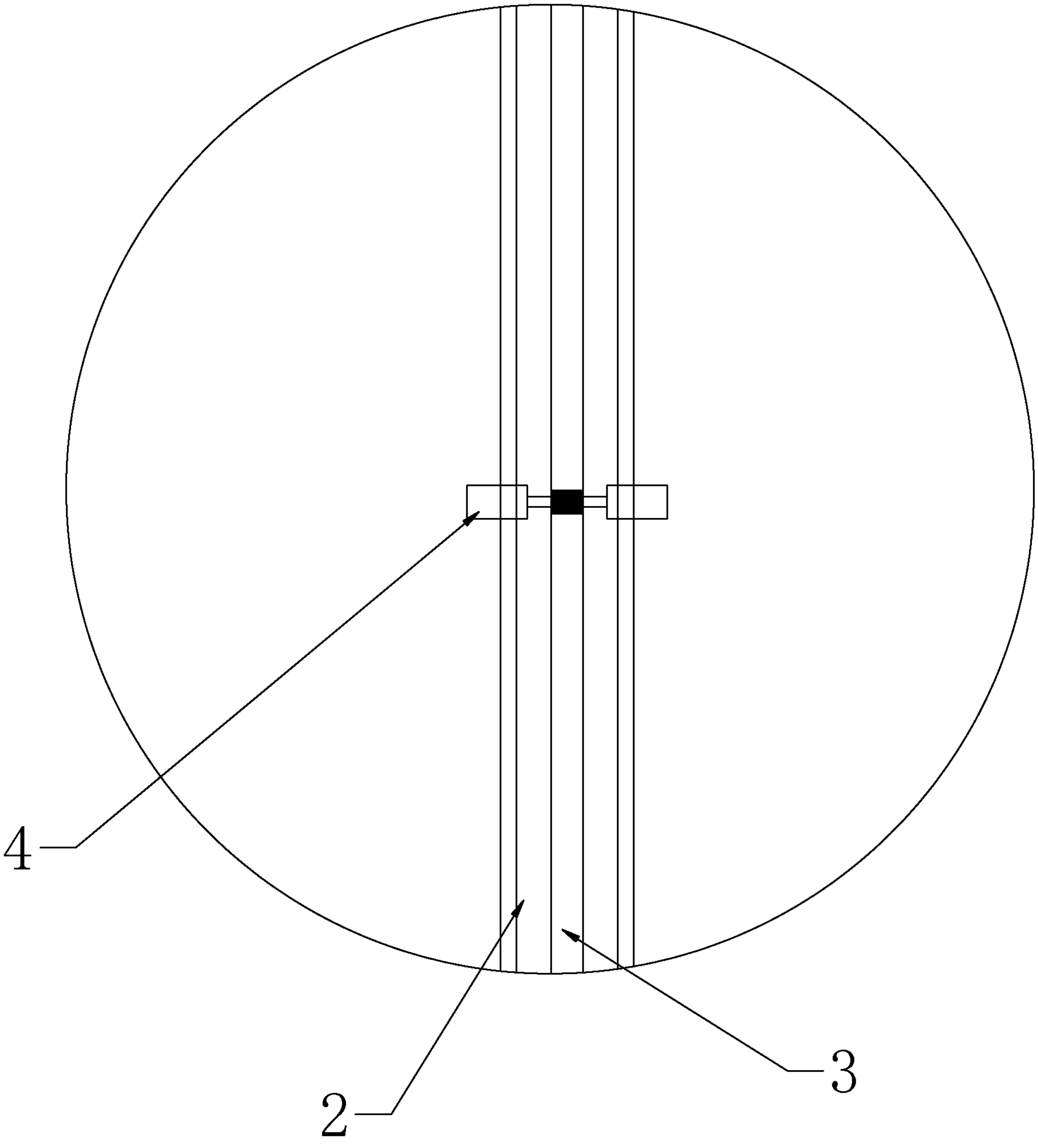
FIG. 3 is an enlarged view of the detail "A" of FIG. 2 according to an embodiment of the present disclosure.

According to embodiments of the disclosure, an electrostatic charging device is provided, as shown in FIGS. 1 to 3, the electrostatic charging device including: a frame body 1, a first accommodating groove 2 arranged inside the frame body 1, an electrode body 3, the electrode body 3 being arranged in the first accommodating groove 2 and arranged along a length direction of the first accommodating groove 2, a plurality of electrode heads 4 penetrating through a wall of the of the first accommodating groove 2 and connected with the electrode body 3. The plurality of electrode heads 4 are arranged along the electrode body 3 at intervals, such that a discharging area covers a whole of an interior of the frame body 1. The electrode body 3 and a connector configured to connect the plurality of electrode heads 4 and the electrode body 3 are sealed in the first accommodating groove 2.

It should be noted that the first accommodating groove 2 configured to hold the electrode body 3 is arranged inside the frame body 1, thereby reducing the space occupied by the electrostatic charging device in the thickness direction. At the same time, the new electrostatic discharging form is adopted, and the electrode heads 4 are evenly arranged, such that the electrostatic charging device can be more fully discharged, and has no charging dead zone, has a better particle charging uniformity and a better charging effect.

Specifically, the electrode head 4 is a carbon fiber brush, fascicular wire or a metal tip. The first accommodating groove 2 is made of an insulating material, and the electrode body 3 and the connector configured to connect the electrode head 4 and the electrode body 3 are sealed in the first accommodating groove 2 by an insulating sealant. The carbon fiber brush includes a plurality of bundles of carbon fiber wires, insulated tubes, and is electrically connected with the electrode body 3 through conductive metal wires.

In the electrostatic charging device of the present embodiment, a plurality of first accommodating grooves 2 are arranged at intervals, and the electrode bodies 3 located in different first accommodating grooves 2 are connected end to end to form an S-bend shape.

In particular, a plurality of electrode bodies 3 located in different first accommodating grooves 2 may be electrically connected by wire 31 or by other means.

Figure 4:
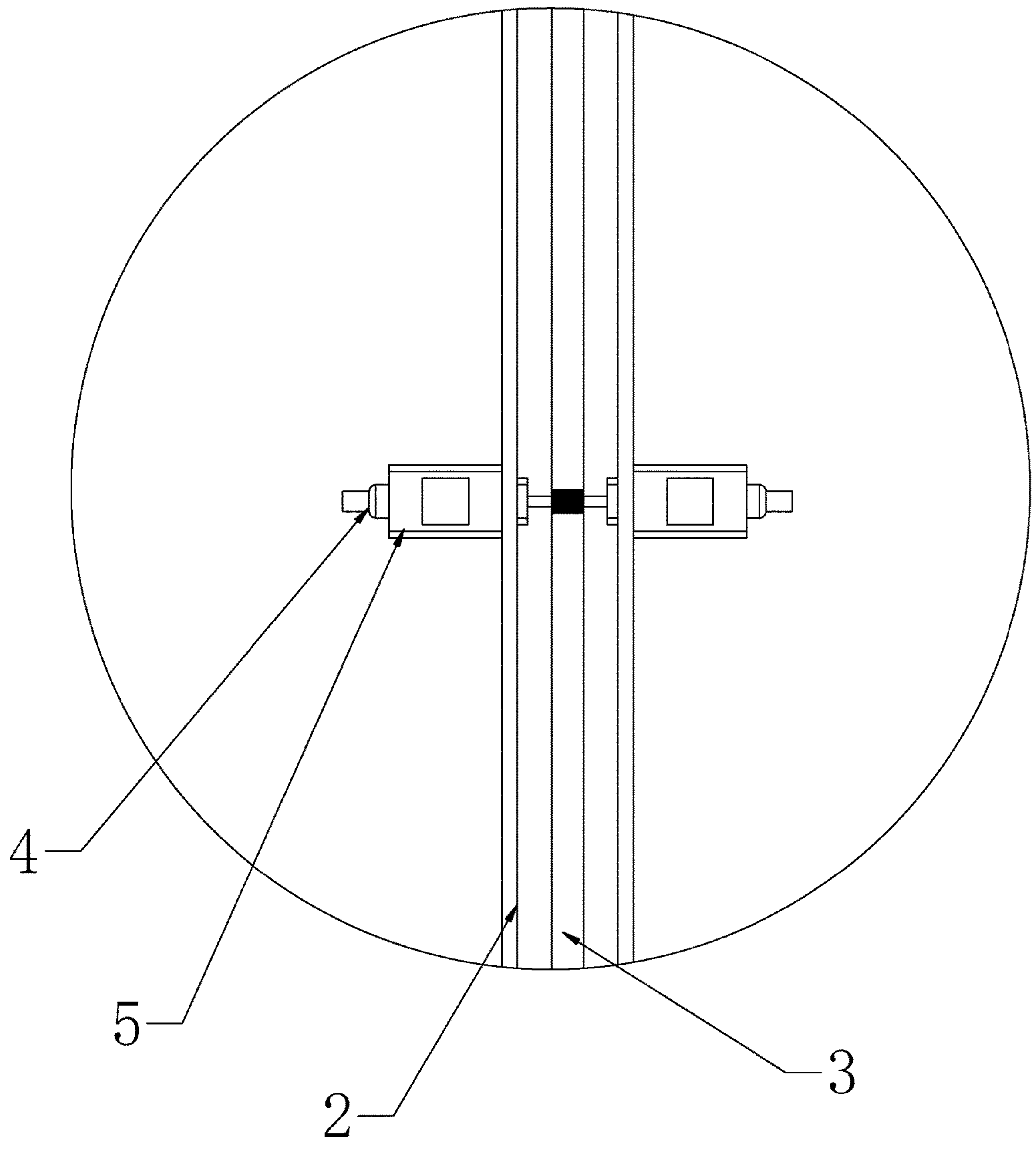
FIG. 4 is another enlarged view of the detail "A" of FIG. 2 according to an embodiment of the present disclosure.

In the electrostatic charging device of the present embodiment, referring to FIG. 4, a plurality of second accommodating grooves 5 configured to hold the plurality of electrode heads 4 are fixedly arranged on an outer side of the wall of the first accommodating groove 2. The plurality of second accommodating grooves 5 are arranged one-to-one corresponding to the plurality of electrode heads 4.

It should be noted that the second accommodating groove 5 is configured to support the electrode head 4 to avoid offset of electrode head 4 due to bumping.

In the electrostatic charging device of the present embodiment, an angle between the arrangement direction of the electrode head 4 and the plane in which the frame body 1 is located is greater than or equal to 0 degrees and less than or equal to 60 degrees to further reduce the thickness of the electrostatic charging device. Both sides of the first accommodating groove 2 are connected with the electrode heads 4. And a distance between two adjacent electrode heads 4 on the same side of the same first accommodating groove 2 is equal to a distance between two adjacent first accommodating grooves 2.

It should be noted that the angle between the arrangement direction of electrode heads 4 and the plane in which the frame body 1 is located is 0 degrees to 60 degrees. The electrode heads 4 are not set windward. In the production, transportation, installation and maintenance, it is not easy to touch or bump the tip of electrode head 4. When the electrode head 4 is made of hard materials such as metal tips, the electrode head 4 does not protrude from the outer surface of the frame body 1 to reduce the installation space occupied by the electrostatic charging device. When the electrode head 4 is made of a flexible material such as carbon fiber brush, the electrode head 4 may protrude from the outer surface of the frame body 1. Preferably, the length of the electrode head 4 protruding the outer surface of the frame body 1 does not exceed 50% of the total length of the flexible material. By using the flexibility of the flexible material, the electrostatic charging device can smoothly pass through the restricted installation site when it is installed in a restricted space. After installation, because the flexible material has the restorability, and the front end of the electrode head 4 is an open space having a thickness no less than the thickness of the frame body 1. The flexible material can automatically restore to the original state, so that the angle between the layout direction of the electrode head 4 and the plane in which the frame body 1 is located can be increased as much as possible, and the flexible material is not easy to cause accidental injury to the staff. In the charging principle, the greater the angle, the better the charging effect.

It is worth mentioning that the electrostatic charging device can be used in scenarios with large installation space when the angle between the layout direction of electrode head 4 and the plane in which the frame body 1 is located is greater than 60 degrees. For example, when the electrode head 4 is positioned perpendicular to the plane in which the frame body 1 is located and a flexible electrode head material, such as a carbon fiber brush, is used, the electrode head 4 can protrude from the outer surface of frame body 1 by a certain distance. Preferably, the length of electrode head 4 protruding the outer surface of frame body 1 does not exceed 50% of the total length of the flexible material. The carbon fiber brush with flexible characteristics can be smoothly passed through the restricted installation site, and after installation, the flexible material can be automatically restored due to the resilience of the flexible material. In the same way, it can also improve the utilization rate of the installation space, meet the same ionization effect, and the ionization device can be thinner and more applicable.

Figure 5:
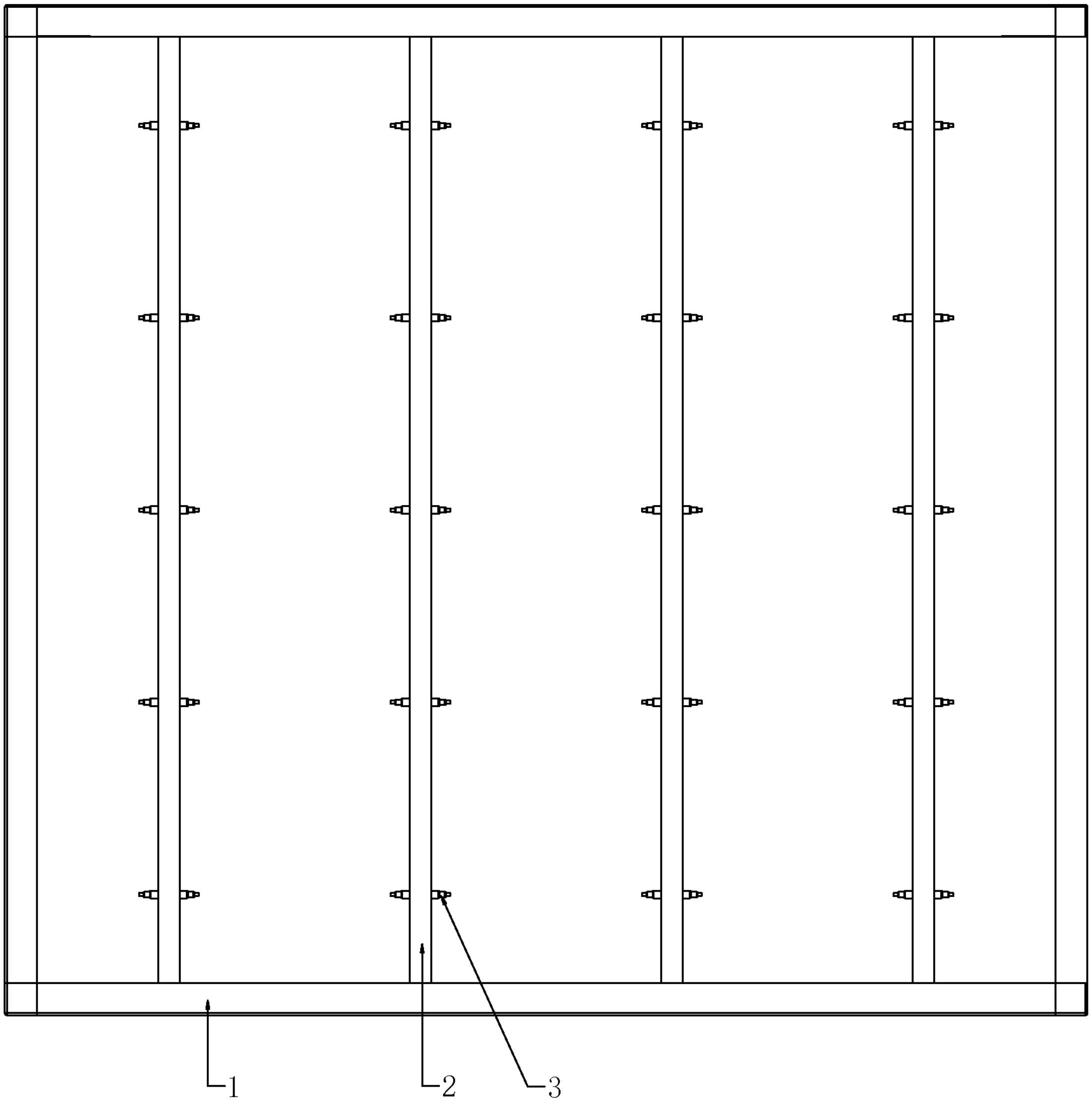
FIG. 5 is a schematic diagram of an arrangement mode of electrode heads according to an embodiment of the disclosure.

In the electrostatic charging device of the present embodiment, please refer to FIG. 5, the angle between the arrangement direction of the electrode head 4 and the plane in which the frame body 1 is located is 0 degrees, that is, the arrangement direction of the electrode head 4 is parallel to the plane in which the frame body 1 is located, and the production and processing are more convenient, and the charging effect meets the use requirement of the electrostatic charging device. Both sides of the first accommodating groove 2 are connected with the electrode heads 4, and the distance between two adjacent electrode heads 4 at the same side of the same first accommodating groove 2 is equal to the distance between two adjacent first accommodating grooves 2. The electrode heads 4 located on both sides of the same first accommodating groove 2 are arranged in parallel to form a plurality of electrode head pairs, and electrode heads 4 located in different first accommodating grooves 2 are arranged in a matrix manner. This is the arrangement mode 1 of the electrode heads.

Figure 6:
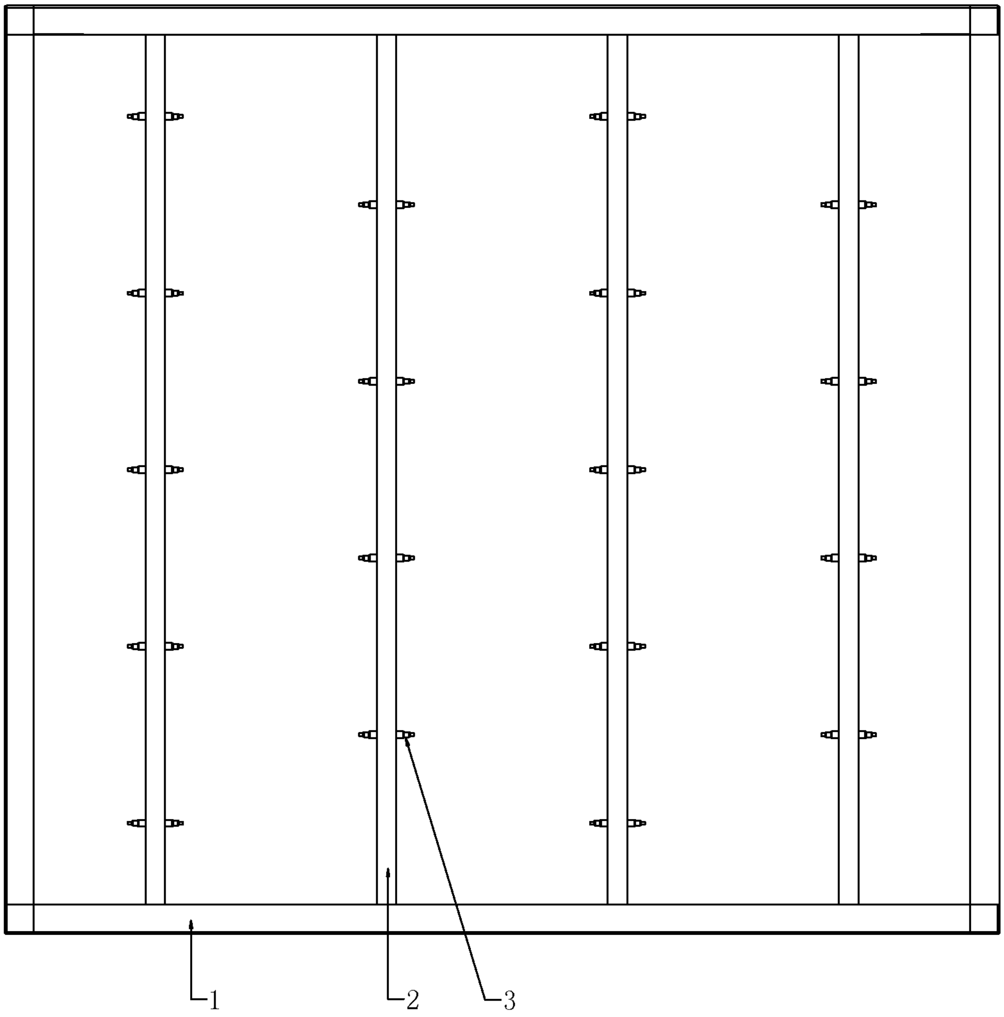
FIG. 6 is a schematic diagram of another arrangement mode of the electrode heads according to an embodiment of the disclosure.

In the electrostatic charging device of the present embodiment, please refer to FIG. 6, the angle between the arrangement direction of the electrode head 4 and the plane in which the frame body 1 is located is 0 degrees, both sides of the first accommodating groove 2 are connected with the electrode heads 4, and the distance between two adjacent electrode heads 4 at the same side of the same first accommodating groove 2 is equal to the distance between the two adjacent first accommodating grooves 2. The electrode heads 4 located on both sides of the same first accommodating groove 2 are arranged in parallel to form a plurality of electrode head pairs, and electrode heads located on different first accommodating grooves 2 are staggered. This is the arrangement mode 2 of the electrode heads.

It should be noted that the electrode head pairs are staggered, and the discharging area formed by the electrode heads 4 on the opposite side of the two adjacent first accommodating grooves 2 is partially overlapping, and it can effectively ensure that the discharging area completely covers the entire frame body 1.

Figure 7:
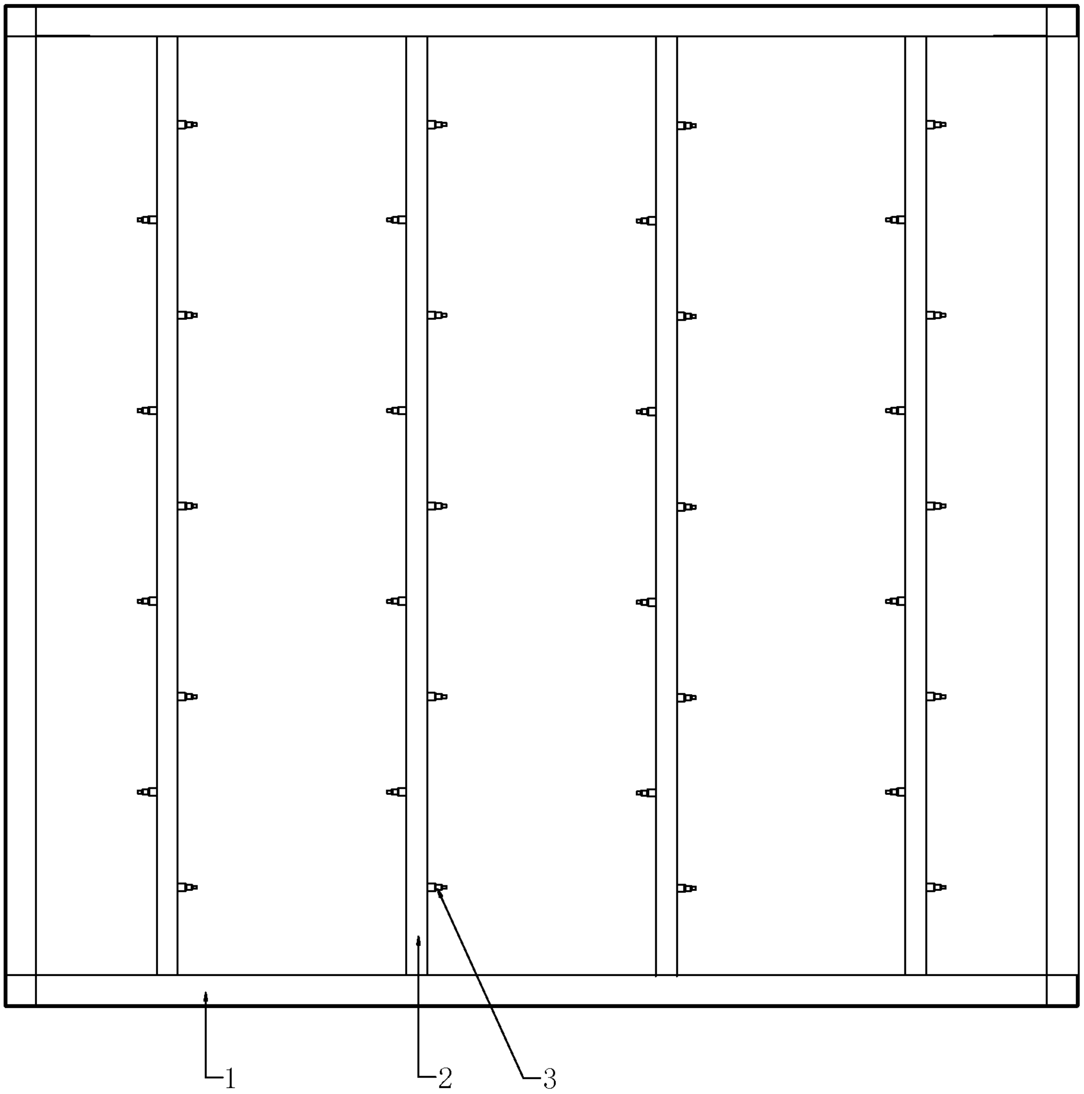
FIG. 7 is a schematic diagram of yet another arrangement mode of the electrode heads according to an embodiment of the disclosure.

In the electrostatic charging device of the present embodiment, please refer to FIG. 7, the angle between the arrangement direction of the electrode head 4 and the plane in which the frame body 1 is located is 0 degrees, both sides of the first accommodating groove 2 are connected with the electrode heads 4, and the distance between two adjacent electrode heads 4 at the same side of the same first accommodating groove 2 is equal to the distance between the two adjacent first accommodating grooves 2. The electrode heads 4 located on both sides of the same first accommodating groove 2 are staggered, and the electrode heads 4 on each of the first accommodating grooves 2 are arranged in the same layout. This is the arrangement mode 3 of the electrode heads.

In order to verify the performance differences of the three arrangement modes of the electrode heads 4, comparative tests are carried out in a standard laboratory. The same micro-electrostatic module is adopted (the conductive materials wraps the dielectric materials to form the electrode plate of the micro-electrostatic module, and the strong electric field between the electrode plates is utilized to capture the charged particles in the air), and then three kinds of electrostatic charging devices are used to compare the PM2.5 purification efficiency of carbon fiber brush electrode head 4 under the same working environment and the same wind speed. In order to reduce test errors, the purification efficiency of PM2.5 was compared by means of averaging the data of three groups of continuous tests.

spark due to the dirty high-voltage electrode box. This will affect the discharging efficiency of electrode head 4, and even lead to the damage of the electrostatic charging device or the high-voltage power supply. The built-in power supply can improve the reliability of the electrostatic charging device. The frame body of the electrostatic charging device is provided with an electric connector configured to connect the external power supply device.

Figure 9:
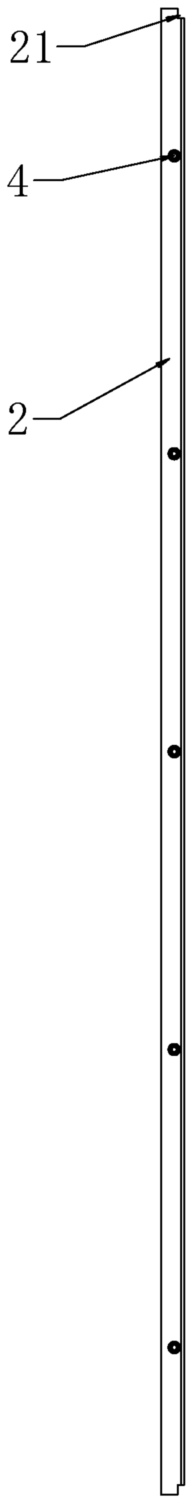
FIG. 9 is a schematic diagram of a first accommodating groove of the present disclosure.

In the electrostatic charging device of the present embodiment, referring to FIG. 9, the first accommodating groove 2 is detachably connected with the interior the frame body 1, each end of the first accommodating groove 2 is provided with a notch 21 matching the frame body 1, and the first accommodating groove 2 does not protrude from the outer surface of the frame body 1 when the first accommodating groove 2 is installed inside the frame body 1.

It should be noted that the two ends of the first accommodating groove 2 are provided with notches 21 matching the frame body 1, so that the two ends of the first accommodating groove 2 are just embedded in the frame body 1, the frame body 1 where the gap 21 is located plays a limiting role to the first accommodating groove 2, thereby increasing the stability of the first accommodating groove 2. The depth

| Temperature ° C. | Relative humidity % | Arrangement mode of the electrode heads 4 / | Number of the micro-electrostatic module / | Width of ventilation mm | Height of ventilation mm | Wind speed m/s | PM2.5 purification efficiency % | |
|---|---|---|---|---|---|---|---|---|
| 24.5 | 50 | mode 1 | 1# | 490 | 400 | 1 | 95.3 | 95.7 |
| | | | | 490 | 400 | 1 | 96.1 | |
| | | | | 490 | 400 | 1 | 95.8 | |
| 24.5 | 50 | mode 2 | 1# | 490 | 400 | 1 | 98.8 | 99.1 |
| | | | | 490 | 400 | 1 | 99.8 | |
| | | | | 490 | 400 | 1 | 98.7 | |
| 24.5 | 50 | mode 3 | 1# | 490 | 400 | 1 | 96.7 | 97.7 |
| | | | | 490 | 400 | 1 | 98.2 | |
| | | | | 490 | 400 | 1 | 98.1 | |

By comparing the test data, it can be seen that each of the three electrostatic charging devices adopting the same micro-electrostatic module has a high PM2.5 purification efficiency, which can indicate that each of the three electrostatic charging devices with the three arrangement modes of the electrode heads 4 has good charging effect. The charging effect of the three arrangement modes of the electrode heads 4 is: arrangement mode 2>arrangement mode 3>arrangement mode 1.

Preferably, in order to make full use of the discharging area of the electrode heads 4, a plurality of first accommodating grooves 2 are arranged parallel and equidistant, and the distance between the first accommodating groove 2 located on the side and the frame body 1 is not greater than ½ of the distance between the two adjacent first accommodating grooves 2.

In the electrostatic charging device of the present embodiment, the electrode body 3 is connected with a high voltage power supply, which is an internal high voltage power supply or an external high voltage power supply.

Figure 8:
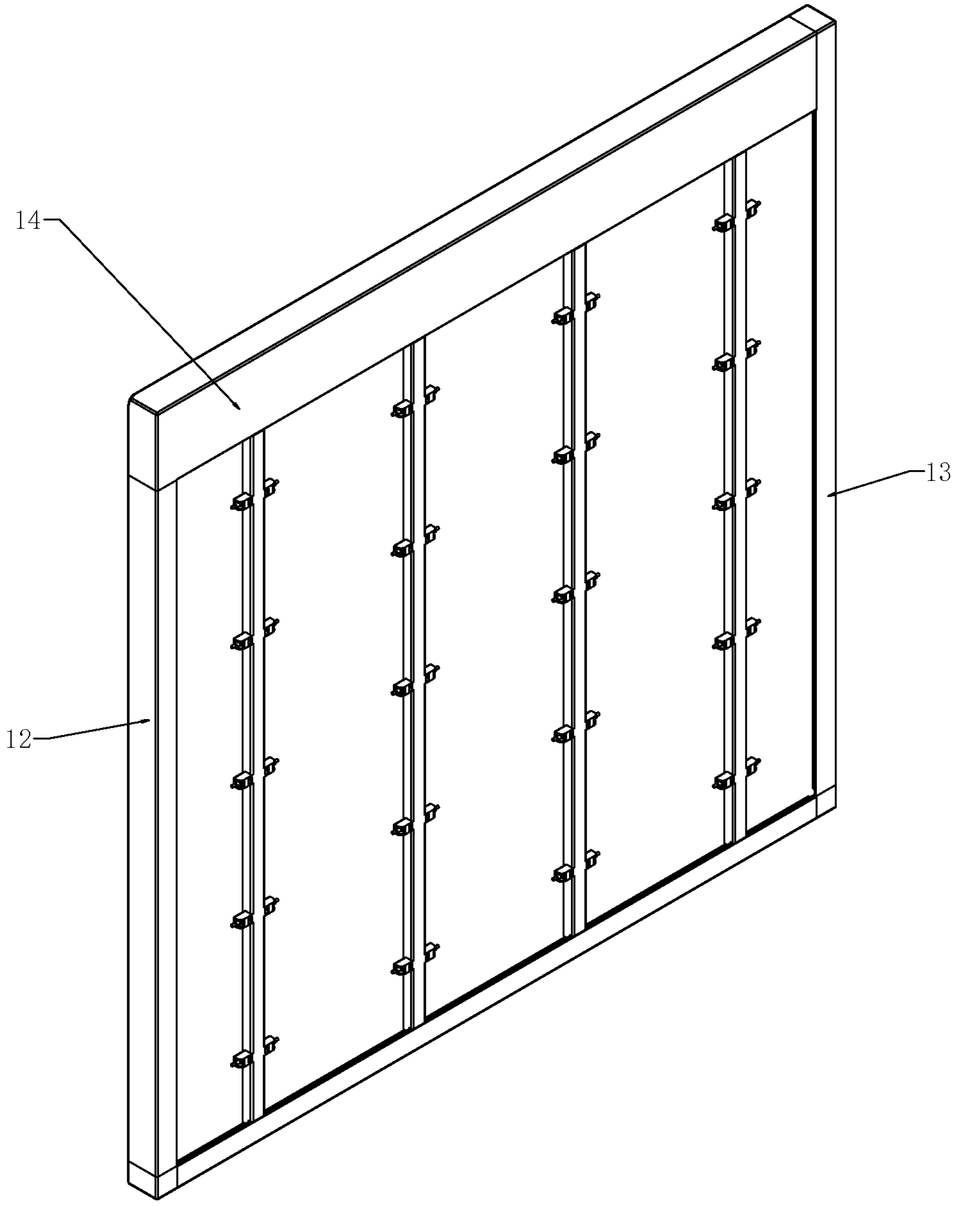
FIG. 8 is a schematic diagram of the electrostatic charging device according to an embodiment of the disclosure.

Preferably, please refer to FIG. 8, the internal high-voltage power supply is used and a power supply bin 14 is installed on one side of frame body 1. The high-voltage power supply is placed in the power supply bin 14. Since the electrostatic charging device needs the high-voltage power supply, when the high-voltage power supply is external, the high-voltage electrode box is exposed to the air for a long time, which will cause the electrode box to creepage and of the gap 21 is less than or equal to the wall thickness of the frame body 1, such that the first accommodating groove 2 will not protrude from the frame plane after installation, which further saves the installation space of the electrostatic charging device.

Preferably, reinforcing bars are added between the adjacent first accommodating grooves 2. When the area of the electrostatic charging device is large, the structural strength and stability are increased by the reinforcing bars between the adjacent first accommodating grooves 2.

In the electrostatic charging device of the present embodiment, the frame body 1 has a first frame 12 and a second frame 13, the first frame 12 and the second frame 13 are complementary structures that can be spliced, which can realize the rapid splicing of multiple electrostatic charging devices. The complementary structures are any splicing structures in the prior art, including mutually compatible planar mechanisms, etc. The positions of the first frame 12 and the second frame 13 are not limited.

Figure 10:
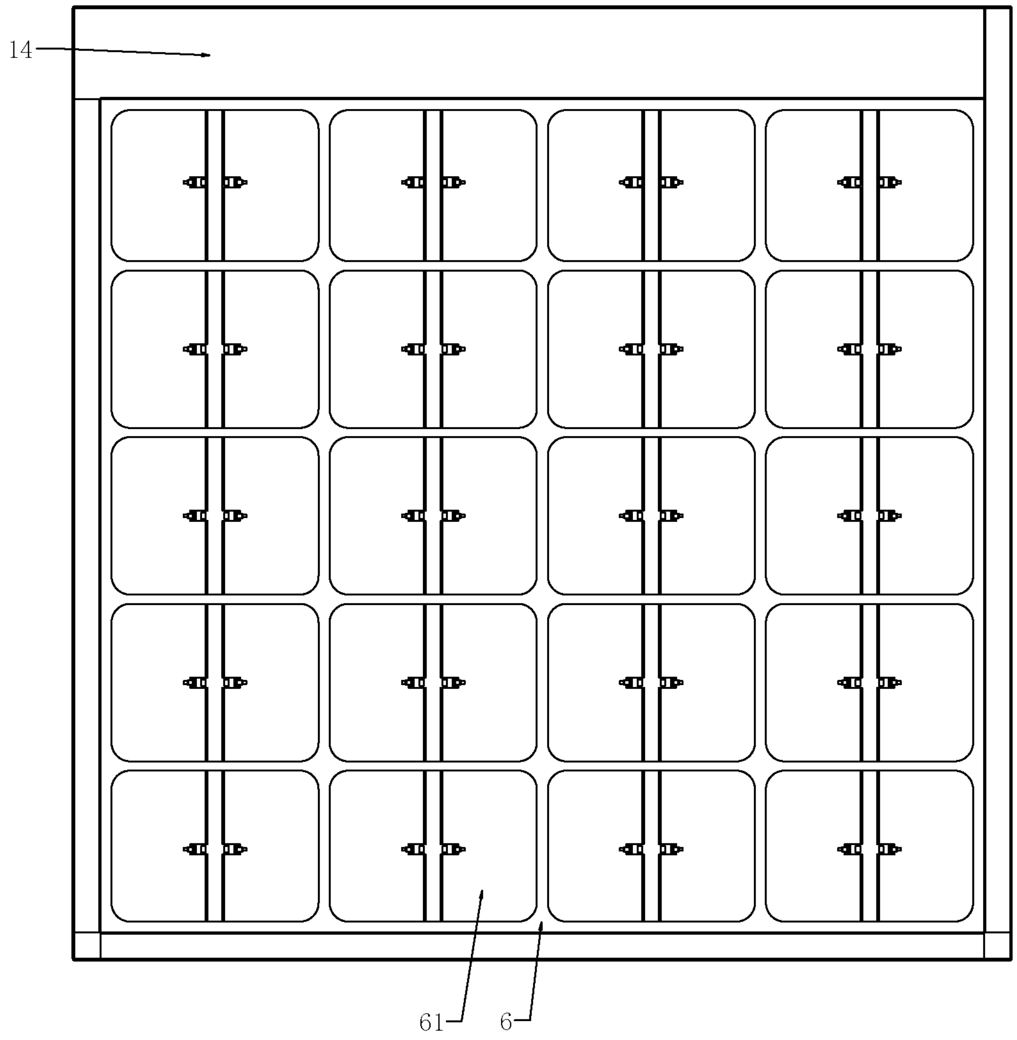
FIG. 10 is a schematic diagram of the electrostatic charging device according to an embodiment of the disclosure.

In the electrostatic charging device of the present embodiment, referring to FIG. 10, the frame body 1 is provided with a discharging conductor 6, and the discharging conductor 6 is provided with a plurality of discharging conductor holes 61 matching the electrode heads 4.

Specifically, the discharging conductive body 6 is made of metal material or non-metal material, and the plurality of discharging conductive holes 61 are arranged as a rectangular array, and each discharging conductive hole 61 is a round hole, a rectangular hole or a nearly round hole with a radian angle.

Preferably, each discharging conductive hole 61 is a rectangular hole, and the four corners of each discharging conductive hole 61 are rounded. The filling rate of rectangular rounded corner is the highest, the blind area is less, the discharging conductive holes 61 can be fully arranged in the discharging conductive body 6, the face wind velocity is uniform, and the ventilation resistance is reduced.

According to another embodiment of the disclosure, an assembly method is provided for assembling the electrostatic charging device. When the first accommodating groove 2 is separately connected with the frame body 1, the first assembly method is used to assemble the electrostatic charging device, and the first assembly method comprises the following steps:

Step S11. arranging the plurality of first accommodating grooves 2 at intervals;

Step S12. putting the plurality of electrode bodies 3 into the plurality of first accommodating grooves 2, and sequentially connecting the electrode bodies 3 in the different first accommodating grooves 2 in an end-to-end manner to form an S-bend shape;

Step S13. sequentially passing the plurality of electrode heads 4 through the wall of each first holding groove 2 to connect with the plurality of electrode bodies 3;

Step S14. filling a sealant into the plurality of first accommodating grooves 2;

Step S15. after the sealant is solidified, installing the frame body 1 to a periphery of the plurality of first accommodating grooves 2.

Specifically, if the electrostatic charging device is provided with a discharging conductor 6, the assembly method 1 further includes: step S16, depositing the discharging conductor 6 on the frame body 1, wherein the discharging conductive holes on the discharging conductor 6 correspond to positions of the electrode heads 4.

When the first accommodating grooves 2 are integrated with the frame body 1, the second assembly method is used to assemble the electrostatic charging device, which comprises the following steps:

Step S21, putting the plurality of electrode bodies 3 into the plurality of first accommodating grooves 2;

Step S22, sequentially passing the plurality of electrode heads through the wall of each first holding groove 2 to connect with the plurality of electrode bodies 3;

Step S23. filling the sealant into the plurality of first accommodating grooves 2.

Specifically, if the electrostatic charging device is provided with a discharging conductor 6, the second assembly method also includes: step S24, depositing the discharging conductor 6 on the frame body 1, wherein the discharging conductive holes on the discharging conductor 6 correspond to positions of the electrode heads 4.

The disclosure has been described in detail above. The above are only preferable embodiments of the disclosure, which can not limit the scope of the disclosure, that is, all equal changes and modifications made in accordance with the scope of the disclosure shall remain within the scope of the invention.

What is claimed is:

1. An electrostatic charging device, comprising:

a frame body, comprising at least one edge frame;

a plurality of rods, provided at interval inside the frame body;

at least one first accommodating groove, provided at each side of each rod and opened to face the at least one edge frame;

an electrode body arranged inside the at least one first accommodating groove and arranged along a length direction of the at least one first accommodating groove, and a plurality of electrode heads penetrating through a wall of the at least one first accommodating groove and connected with the electrode body and provided facing the at least one edge frame;

wherein the plurality of electrode heads are arranged along the electrode body at intervals, such that a discharging area covers a whole of an interior of the frame body, wherein each electrode head is a wire electrode, or brush electrode, an angle between an arrangement direction of each electrode head and a plane in which the frame body is located is greater than or equal to 0 degrees and less than or equal to 60 degrees;

the electrode body is sealed in the at least one first accommodating groove.

2. The electrostatic charging device according to claim 1, wherein a plurality of first accommodating grooves are arranged at intervals, and a plurality of electrode bodies located in different first accommodating grooves are sequentially connected in an end-to-end manner.

3. The electrostatic charging device according to claim 2, wherein both sides of each first accommodating groove are connected with the electrode heads; and a distance between two adjacent electrode heads on a same side of a same first accommodating groove is equal to a distance between two adjacent first accommodating grooves.

4. The electrostatic charging device according to claim 3, wherein the angle between the arrangement direction of each electrode head and the plane in which the frame body is located is 0 degrees.

5. The electrostatic charging device according to claim 4, wherein the electrode heads connected to two sides of the same first accommodating groove are arranged in parallel to form a plurality of electrode head pairs, and the plurality of electrode head pairs located in different first accommodating grooves are in a staggered arrangement or in a matrix arrangement.

6. The electrostatic charging device according to claim 4, wherein the electrode heads connected to two sides of the same first accommodating groove are in a staggered arrangement.

7. The electrostatic charging device according to claim 1, wherein the electrode body is connected with a high voltage power supply, the high voltage power supply is a built-in high voltage power supply or an external high voltage power supply.

8. The electrostatic charging device according to claim 1, wherein a plurality of second accommodating grooves configured to hold the plurality of electrode heads are fixedly arranged on an outer side of the wall of the at least one first accommodating groove, and the plurality of second accommodating grooves one-to-one correspond to the plurality of electrode heads.

9. The electrostatic charging device according to claim 1, wherein the at least one first accommodating groove is detachably connected with the interior of the frame body, and each end of the at least one first accommodating groove is provided with a notch matching the frame body, and when the at least one first accommodating groove is deposited inside the frame body, the at least one first accommodating groove does not protrude from an outer surface of the frame body.

10. The electrostatic charging device according to claim 1, wherein the at least one edge frame comprises a first edge frame and a second edge frame, and the first edge frame and the second edge frame are complementary structures that can be spliced.

11. The electrostatic charging device according to claim 1, wherein the frame body is provided with a discharging conductor, and the discharging conductor is provided with a plurality of discharging conductive holes matching the plurality of electrode heads.

12. An assembly method for assembling the electrostatic charging device according to claim 1, when the plurality of first accommodating grooves are separately connected to the frame body, the assembly method comprises the following steps:

Step S11. arranging the plurality of first accommodating grooves at intervals;

Step S12, putting the plurality of electrode bodies into the plurality of first accommodating grooves, and sequentially connecting the electrode bodies in different first accommodating grooves in an end-to-end manner to form an S-bend shape;

Step S13, sequentially passing the plurality of electrode heads through the wall of each first holding groove to connect with the plurality of electrode bodies;

Step S14. filling a sealant into the plurality of first accommodating grooves;

Step S15. after the sealant is solidified, installing the frame body to a periphery of the plurality of first accommodating grooves;

when the plurality of first accommodating grooves are integrated with the frame body, the assembly method comprises the following steps:

Step S21, putting the plurality of electrode bodies into the plurality of first accommodating grooves;

Step S22, sequentially passing the plurality of electrode heads through the wall of each first holding groove to connect with the plurality of electrode bodies;

Step S23. filling the sealant into the plurality of first accommodating grooves, and waiting for a period of time until the sealant has solidified.

13. The assembly method according to claim 12, further comprising:

installing the discharging conductor on the frame body, wherein the discharging conductive holes on the discharging conductor correspond to positions of the plurality of electrode heads.

* * * * *